United States Patent [19]

Doyle et al.

[11] Patent Number: 4,894,798
[45] Date of Patent: Jan. 16, 1990

[54] AUTOMATIC STOP CODE INSERTION FEATURE FOR A WORD PROCESSING APPARATUS

[75] Inventors: Marguerite H. Doyle; Roger W. Early; Steven R. Myers; Terrence W. Ringle; David R. Smith, all of Lexington, Ky.

[73] Assignee: International Business Machines Corporation, Armonk, N.Y.

[21] Appl. No.: 876,615

[22] Filed: Jun. 20, 1986

[51] Int. Cl.⁴ .......................... G06F 3/12; B41J 21/16
[52] U.S. Cl. .................................... 364/900; 364/930; 364/926.7; 364/943.44; 364/948.2; 364/519; 400/61; 400/279
[58] Field of Search ... 364/200 MS File, 900 MS File, 364/518, 519; 400/8, 63, 61, 67, 68, 69, 74, 149, 290, 279

[56] References Cited

U.S. PATENT DOCUMENTS

| | | | |
|---|---|---|---|
| 3,781,856 | 12/1973 | Aizawa et al. | 364/200 |
| 4,086,660 | 4/1978 | McBride | 364/900 |
| 4,136,395 | 1/1979 | Kolpek et al. | 400/63 |
| 4,205,922 | 6/1980 | Pascoe | 364/900 |
| 4,327,421 | 4/1982 | Wang | 364/900 |
| 4,334,792 | 6/1982 | Joest, III et al. | 400/63 |
| 4,382,702 | 5/1983 | Fessel | 400/83 |
| 4,456,969 | 6/1984 | Herzik et al. | 364/900 |
| 4,456,973 | 6/1984 | Carlgren et al. | 364/300 |
| 4,495,490 | 1/1985 | Hopper et al. | 340/709 |
| 4,541,746 | 9/1985 | Bobart et al. | 400/144.2 |
| 4,553,860 | 11/1985 | Imaizumi et al. | 400/68 |
| 4,564,301 | 1/1986 | Ueno | 364/519 |
| 4,564,304 | 1/1986 | Ueno | 400/279 |
| 4,671,684 | 1/1987 | Kojima et al. | 400/61 |
| 4,672,571 | 6/1987 | Bass et al. | 364/900 |
| 4,831,583 | 5/1989 | Pascoe | 364/900 |

FOREIGN PATENT DOCUMENTS 0052725 6/1982 European Pat. Off. .
0129005 12/1984 European Pat. Off. .

OTHER PUBLICATIONS

T. L. Adam et al., "Spelling Processing Functions Operator Interface", IBM Technical Disclosure Bulletin, vol. 24, No. 10, Mar. 1982, Entire Document.
A. H. Karp, "Text Processing with Multiple Type Elements", IBM Technical Disclosure Bulletin, vol. 23, No. 3, Aug. 1980, p. 1225.

Primary Examiner—Raulfe B. Zache
Assistant Examiner—Florin Munteanu-r
Attorney, Agent, or Firm—Laurence T. Letson

[57] ABSTRACT

A word processing apparatus is capable of detecting the entry of a function or operation during keying of the text into memory, which requires an operator intervention such as the changing of the print element or the changing of the format parameters. Upon the detection of that condition, an automatic operation is invoked by the software process to insert into the text string and memory a stop code. This insures that the playout of the stored text will be interrupted to permit the operator to perform the same or related operation at the same relative position in the text.

8 Claims, 3 Drawing Sheets (54)

AUTOMATIC STOP CODE INSERTION FEATURE FOR A WORD PROCESSING APPARATUS

FIELD OF THE INVENTION

The described invention relates to a word processing apparatus and the operation of the apparatus and more specifically, to the automatic insertion of stop codes into a text string as it is recorded, upon the occurrence of predetermined events. This insures that the apparatus will stop subsequent playout operations to allow the operator to perform the required steps for the event, such as changing the format, changing the print element or keying in variable text which is to be inserted into the space designated by an electronic mark relative to the record sheet.

BACKGROUND OF THE INVENTION

Word processing apparatuses, including the more sophisticated electronic typewriters, have the capability of storing text in a memory as it is keyed into the keyboard. In many instances when text is being entered through the keyboard, it is necessary to perform some step or function which, upon playout of the text, will require the operator to take some related action at the same relative point on the record sheet. Examples of such instances include changing the print element to print a different typestyle, electronically marking a spot relative to the record sheet, so that the print mechanism may be commanded to go directly to that same relative spot on subsequent playout, and changing the format, particularly the margins and tab stops, by switching to a second stored set of margins and/or tab stops.

Failure of the operator to insert into the text string a stop code at this point will result in the playout of the stored text without the desired operation being performed. For example, if a typestyle change was desired, without the stop code in the text string, the playout would not stop to permit the operator to change the print element. This failure of the operator to insert stop codes where needed to permit the operator to perform a needed manual operation or entry is a source of errors and frustration to the operator.

SUMMARY OF THE INVENTION

As the text is keyed into the keyboard, and the operator performs one of the actions which will require a related or the same action when the text is played out, such as keying in a coded keystroke to change format or removing and reinserting a print element, a stop code is inserted. The electronic controls of the apparatus detect that at least one of the predefined actions has been taken, either from a signal from the keyboard or a sensor signal from a sensing device mounted in the apparatus. This signal is decoded by the electronic controls and the controls insert into the text string, a stop code signal which is stored with the rest of the text codes.

The automatic insertion of the stop code into the text string makes the apparatus easier to use and more forgiving of oversights by the operator. It also makes the device easier to learn and reduces the operator's apprehension about the apparatus and its functions.

DRAWINGS

DETAILED DESCRIPTION OF THE INVENTION

Figures 1, 3:
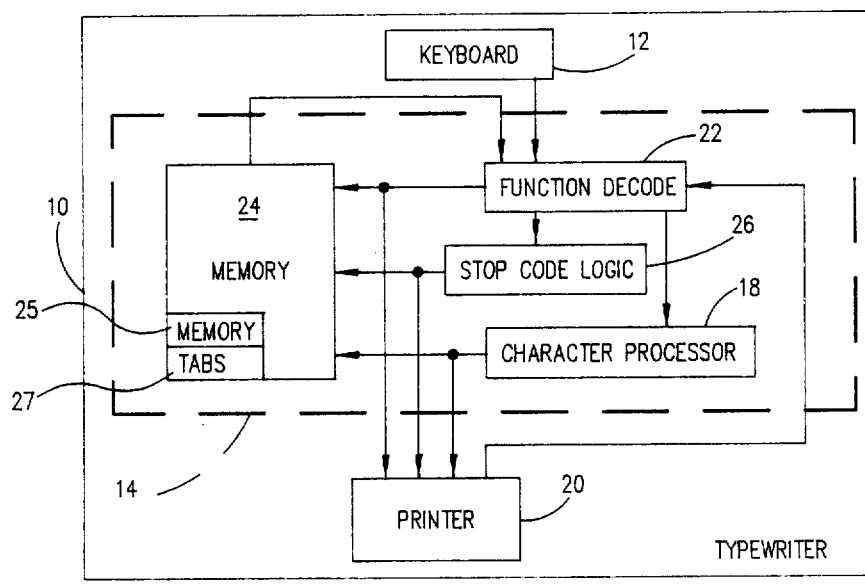
FIG. 1 is a block diagram of a typewriter which has text storage and automatic stop code insertion incorporated.
FIG. 3 illustrates an example of a text page with locations of positions at which an automatic stop code insertion would occur.

The detailed description of the invention will be that of the preferred embodiment. The preferred embodiment is an electronic typewriter which is controlled by electronic controls. The electronic controls preferably take the form of a microprocessor which is controlled by a program. The program is represented by the flow diagram in FIG. 2. Any person skilled in the art of programming will be able to write the detailed code instructions to implement the logic flow of FIG. 2. The detailed code instructions will vary depending upon the specific microprocessor selected for use in a typewriter. The preferred microprocessor is an Intel 8031 manufactured by the Intel Corporation, Santa Clara, Calif. Other microprocessors manufactured by Intel Corp. and by other companies would be equally useful in this environment, when programmed with a program compatible with the specific requirements of that particular microprocessor.

A typewriter having word processing functions may be considered a word processing apparatus. Such a typewriter is illustrated in block diagram form in FIG. 1, with much of the non-essential portions not shown. Typewriter 10 comprises a keyboard 12 which is capable of providing signals which represent characters to be typed as well as functions that may be performed by the apparatus.

The keyboard signals for characters and function commands are provided to the electronic controls 14, in practice a microprocessor and associated memory for storage of a program and for the storage of the text typed. The electronic controls 14 are illustrated functionally, but it should be understood that in the preferred form the illustrated functions are performed by a programmed microprocessor. Such an electronic control is embodied in the IBM WHEELWRITER 5 Typewriter or the QUIETWRITER 7 Typewriter sold by International Business Machines, Corporation, of Armonk, N.Y. Electronic controls 14 comprise a function decode 22 which receives the keyboard signals. The function decode 22 processes the signals to determine if the signal is a function signal or a character signal. If the signal is not a function signal, then the signal is passed to the character processor 18 which determines the signals which need to be sent to the typewriter print mechanism 20 comprising print impact hammer 17, carrier 13 and print element 15, to accomplish printing.

If the keyboard signal or code is one which represents a function, the function decode detects this input as a function and decodes the keyboard signal. If the signal is storable, the function signal may be stored in the memory 24 which is of the read write type. If the memory is not being used to store the text and functions keyed from the keyboard, then the function signal is directly utilized to control the printer 20, and the memory 24 will not reflect the processing of the function command.

After the function decode 22 accomplishes its operation, the keyboard signal representing functions, in its decoded form, is passed to the stop code logic 26. Stop code logic block 26 represents the operations which are depicted in flow diagram form in the flow chart of FIG. 2. As stated earlier, the flow chart operations are preferably performed by a programmed microprocessor.

Figure 2:
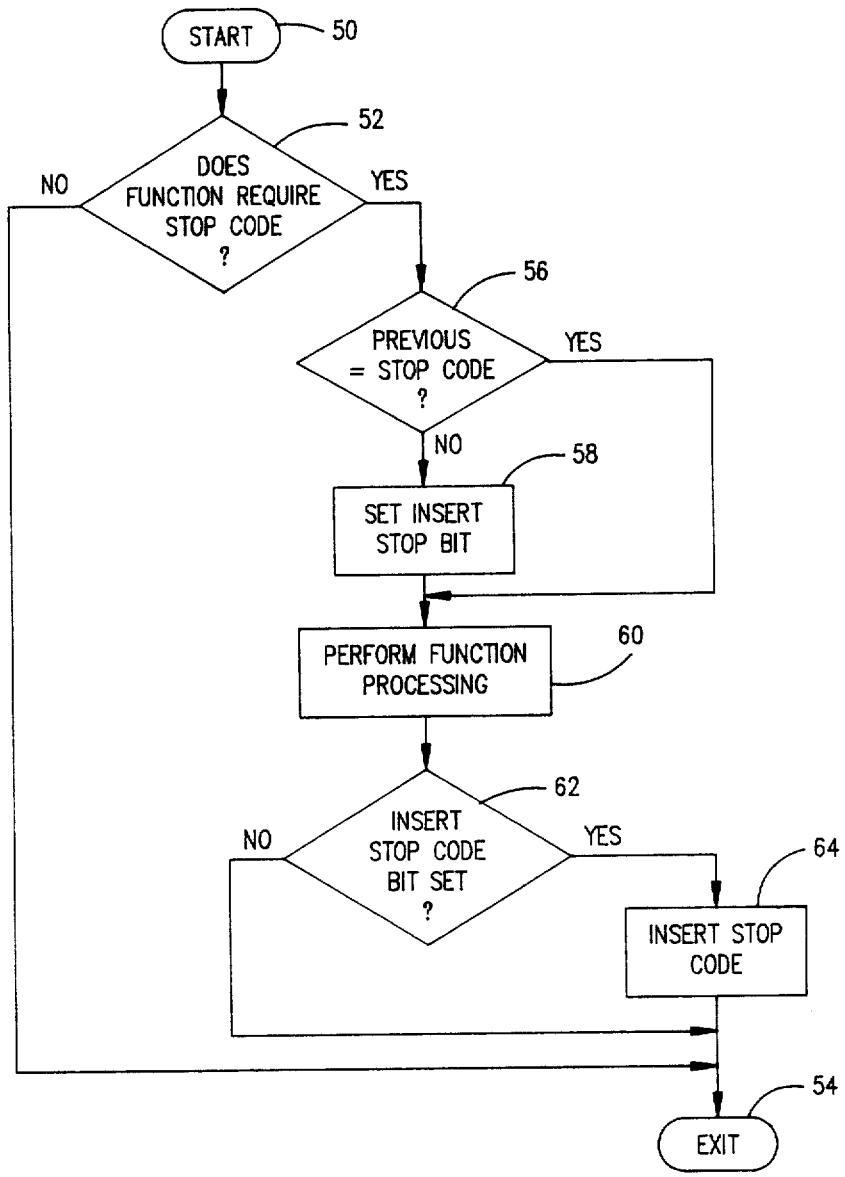
FIG. 2 illustrates the flow diagram for the subroutine which implements the automatic stop code insert function.
Figure 4:
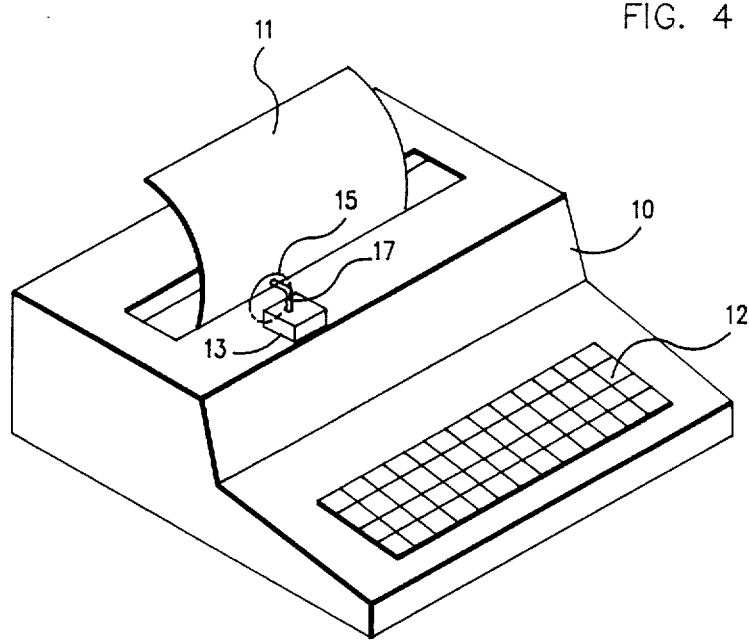
FIG. 4 illustrates a typewriter and its various parts.

Referring to FIG. 2, the start point 50 corresponds to the decoded function code input to the stop code logic 26. The stop code logic 26 (block 52) will then determine if the function code is one of the predetermined codes commanding the operation of the typewriter 10 which will require an operator to perform a manual step. Examples of such codes which could emanate from the keyboard would be the mark function or the change of the format. An example of the codes which would come from a machine condition sensor would be the signal indicating the removal and the reinsertion of the print element. This signal is generated by a device similar to the one disclosed in U.S. Pat. No. 4,541,746. The electronic controls would interpret the signals flowing from the device and then provide a signal unique to the function to identify that function to the function decode 22. The output of the function decode 22 will be transmitted to the stop code logic 26 like the signals passing from the keyboard through the function decode 22.

If the decision of block 52 is a negative result, the logic flow branches to the exit 54 of the routine, since no action on the part of the electronic controls 14 is required for other functions, with respect to the insertion of stop codes.

Should the determination in block 52 be affirmative, the next step is to determine if the previous code in the text string stored in the memory 24 is a stop code. This step is necessary to prevent the unnecessary duplication of stop codes. The determination of the type of the code stored previously is represented by block 56. If the decision made in block 56 is that the previous code stored in memory is not a stop code, then a flag bit is set as a result of the instruction issued by the logic as represented by block 58. This "insert stop code flag bit" will insure that after the stored function code is processed, the stop code will be set and stored in the proper sequence, within memory 24. Typewriters such as the IBM WHEELWRITER 5 and QUIETWRITER 7 Typewriters have a keybutton input to cause the microprocessor to execute a set stop code subroutine contained in the program resident in the typewriters. This same routine may be branched to under the logic flow in the microprocessor to set the stop code in response to this routine as represented by block 64.

When the determination is that the previous code is a stop code, there is no need to store an additional stop code and the flag bit need not be set. Accordingly, the logic flow will branch to bypass the step of setting the insert stop code flag bit in block 58 and pass the control flow directly to the perform function processing step in block 60.

The perform function processing step, block 60, is a generic description for the steps that the electronic controls 14 accomplishes for the several functions, the steps being unique to each of the functions. In effect, block 60 may be envisioned as a branch to the main text processing program and a return to the stop code insertion routine upon completion of the processing of the function keyed at the keyboard 12.

Upon the completion of the function processing, the flow returns to the subroutine and routes to block 62, where the presence of the stop code flag bit is tested and if found the stop code is inserted, as indicated at block 64. The flow then proceeds to the exit 54.

If, at block 62, the insert stop code bit is not set, because the previous code was a stop code, then no stop code need be set, the flow branches to the exit 54.

To further correlate the automatic insertion of stop codes with the end result, reference is made to FIG. 3, wherein typed text is shown only by way of example to illustrate the locations at which certain actions are taken and the results thereof.

The vertical arrows are indicators of location and are referred to by reference numerals. As the text is being keyed and stored in memory 24, and location 70 is reached, the operator decides to reformat the following text. At this point, a second set of margin values or settings are retrieved from margin memory 25 and as a result of this command being issued by the typewriter keyboard 12, a stop code is inserted into the text string following the word "change." This insertion will assure the stopping of the text playout at this point so that the operator may again command the change in the format. Reference numeral 72 represents the new format left margin.

The same sequence of operations occurs at location 74 so that the operator may change the format back to the original margin settings and then the text will begin playout at location 76. Similarly, the tab stop values may be stored and retrieved from section 27 of memory 24, so that tab stop settings may be changed.

When the operator reaches the point where the text is to be printed in bold face or other typestyle on record sheet 11, it is necessary to change print elements. Such a point is reached at position 78. At position 78, the operator changes the print element and at that time the sensor signals that the print element has been removed and a print element reinserted. The stop code insertion logic 26 will then store a stop code to interrupt the playout to allow the operator to change print elements at that time to produce the desired copy. The same sequence of events occurs at location 80 when the original type element is replaced on the machine.

The insertion of variable information onto a record sheet 11 at a specific location relative to the record sheet 11 may be accomplished by electronically marking the spot relative to the sheet 11. When the spot is marked, a stop code is inserted at that point, to insure that the text playout is interrupted at that point, such as at position 82, to allow the insertion of the variable text.

From the foregoing explanation of the logic flow, it will be appreciated that the program subroutine which is an improvement over previous word processing programs will automatically cause the insertion of a stop code into a text string whenever the typist keys a predetermined function at the keyboard or changes the print element of a typewriter during the keying of the draft text. The insertion of the stop codes insures that the typewriter or word processing apparatus will stop during the later playout of the text so that the operator may change the print element, insert variable text associated with the particular location on the record sheet or change the format settings in the typewriter or take other appropriate action. The automatic insertion of the stop codes relieves the operator of the need to remember to insert the codes and makes the apparatus easier to learn and operate.

We claim:

1. A word processing apparatus comprising:

a keyboard for inputting first commands to said word processing apparatus to effect the printing of text and to control the storage of said text said keyboard further comprising means for inputting of second commands for controlling functions affecting printing operations of said apparatus;

a print means for forming an image on a record sheet upon command from said keyboard;

control means comprising means for storing codes representative of said text and parameters defining the formatting of said text;

said control means responsive to said keyboard and connected to said spring means for controlling said print means to print images corresponding to said first commands through the keyboard and to print text stored in said control means;

said control means comprising means for detecting changes in said functions and means for determining whether any said change in said functions requires operator intervention;

insertion means, responsive to said means for determining, for inserting into said stored text a stop code without operator action, whereby when said text is played out said apparatus will respond to said stop code and interrupt playout operations pending said operator intervention.

2. The word processing apparatus of claim 1 wherein said means for storing codes is a memory of the read/write type.

3. The word processing apparatus of claim 1 wherein said parameters comprise a signal signifying the marking of a position relative to said record sheet.

4. The word processing apparatus of claim 1 wherein said print means comprises a print impact means and a print element.

5. The word processing apparatus of claim 1 wherein said parameters comprise print identification.

6. The word processing apparatus of claim 1 wherein said parameters comprise tabulation stop settings.

7. The word processing apparatus of claim 1 wherein said parameters comprise margin settings.

8. A word processing apparatus comprising:
a keyboard for generating keyboard signals;
a printer;
means for storing keyboard signals;
means responsive to said keyboard or said means for storing keyboard signals for operating said printer;
means for monitoring said keyboard signals to detect those keyboard signals requiring a stop code be inserted along with said keyboard signals into said means for storing;
means, responsive to said means for monitoring, for creating and storing, in said means for storing, a stop code,
whereby said stop code will be positioned in said means for storing to be operative when played out to interrupt said printer at a predefined relative position with respect to the keyboard signals stored in said means for storing.

* * * * *